United States Patent
Rodman et al.

(10) Patent No.: US 7,529,566 B2
(45) Date of Patent: May 5, 2009

(54) SPEAKERPHONE WITH A CELLULAR PHONE CONNECTION

(75) Inventors: Jeffrey C. Rodman, San Francisco, CA (US); Greg Goldfarb, Burlingame, CA (US)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 11/076,360

(22) Filed: Mar. 9, 2005

(65) Prior Publication Data

US 2005/0233778 A1 Oct. 20, 2005

Related U.S. Application Data

(60) Provisional application No. 60/562,782, filed on Apr. 16, 2004.

(51) Int. Cl.
*H04M 1/00* (2006.01)
*H04M 9/00* (2006.01)

(52) U.S. Cl. .............. 455/569.1; 455/557; 379/420.01; 379/420.02; 379/420.03; 379/420.04; 379/433.02

(58) Field of Classification Search ............. 455/569.1, 455/557; 379/420.01–420.04, 433
See application file for complete search history.

(56) References Cited

U.S. PATENT DOCUMENTS

| | | | | |
|---|---|---|---|---|
| 4,991,197 | A * | 2/1991 | Morris | 455/557 |
| 5,841,851 | A * | 11/1998 | Recht et al. | 379/156 |
| 5,991,646 | A * | 11/1999 | Frank et al. | 455/569.2 |
| 6,002,937 | A * | 12/1999 | Young et al. | 455/462 |
| 6,301,339 | B1 * | 10/2001 | Staples et al. | 379/93.01 |
| 6,314,179 | B1 * | 11/2001 | Chen | 379/388.02 |
| 6,507,653 | B1 * | 1/2003 | Romesburg | 379/406.05 |
| 6,647,103 | B2 * | 11/2003 | Pinard et al. | 379/110.01 |
| RE38,645 | E * | 11/2004 | O'Sullivan | 455/556.1 |
| 6,844,966 | B2 * | 1/2005 | Kho et al. | 359/402 |
| 6,856,687 | B2 * | 2/2005 | DiSanto et al. | 380/243 |
| 6,926,130 | B2 * | 8/2005 | Skowronski | 320/115 |
| 6,957,089 | B2 * | 10/2005 | Oh et al. | 455/569.1 |
| 6,973,179 | B1 | 12/2005 | Kaufman et al. | |
| 7,120,238 | B1 * | 10/2006 | Bednarz et al. | 379/201.1 |

(Continued)

FOREIGN PATENT DOCUMENTS

JP 02-312428 12/1990

(Continued)

OTHER PUBLICATIONS

Richard A. Brome, Phone Scoop; http://www.phonescoop.com/glossary/term/php.

(Continued)

*Primary Examiner*—Matthew D Anderson
*Assistant Examiner*—Wen W Huang
(74) *Attorney, Agent, or Firm*—Wong, Cabello, Lutsch, Rutherford & Brucculeri, LLP

(57) ABSTRACT

A speakerphone with a jack or a plug to allow a full featured speakerphone to be used with a wireless telephone handset. In one embodiment, a jack is installed on a speakerphone. A cable can connect the speakerphone using this jack and a headset jack on wireless phone handset. In another embodiment, the cable is embedded in the speakerphone. In another embodiment, the speakerphone is operated by an internal power source.

40 Claims, 2 Drawing Sheets

U.S. PATENT DOCUMENTS

| | | | |
|---|---|---|---|
| 2003/0059062 A1* | 3/2003 | Soo et al. | 381/93 |
| 2003/0078071 A1* | 4/2003 | Uchiyama | 455/557 |
| 2003/0087676 A1 | 5/2003 | Lloyd et al. | 455/569 |
| 2003/0157929 A1 | 8/2003 | Janssen et al. | 455/416 |
| 2004/0063456 A1* | 4/2004 | Griffin et al. | 455/550.1 |
| 2004/0204185 A1* | 10/2004 | Snyder et al. | 455/574 |
| 2005/0049004 A1* | 3/2005 | Bultman | 455/557 |
| 2006/0128376 A1* | 6/2006 | Alexis | 455/426.1 |

FOREIGN PATENT DOCUMENTS

| | | |
|---|---|---|
| JP | 03-109846 | 5/1991 |
| JP | 04-043750 | 2/1992 |
| JP | 2000-101702 | 4/2000 |
| JP | 2002-344635 | 11/2002 |
| JP | 2004-040383 | 2/2004 |
| TW | 549755 Y | 8/2003 |

OTHER PUBLICATIONS

Clip n Go Speakerphone; http://www.1-800-mobiles.com/clipngo.html.

Motorola—Plug-in Hands-Free Speakerphone; http://maycellphone.com/detail.asp.

Dock 'N' Talk Speakerphone StarT; http://maycellphone.com/detail.asp.

AT&T 4-Line Corded Intercom Speakerphone with CallerID/Call; http://store.yahoo.com/celebrity cookware/955.html.

GE 2793GE3 2.4GHZ Abswerer Delux; http://www.valcoelectronics.com/ge/27939.htm.

Search Report received in corresponding European Patent Application (EP 1 587 294) dated Aug. 11, 2005.

Office Action/Rejection received in corresponding Japanese Patent Application No. JP 2005-118442 dated Dec. 19, 2006.

* cited by examiner

SPEAKERPHONE WITH A CELLULAR PHONE CONNECTION

CROSS-REFERENCE TO RELATED APPLICATIONS

This patent application claims priority from a provisional patent application Ser. No. 60/562,782, filed on Apr. 16, 2004 with the same inventors and same title, which is incorporated herein. This patent application is related to another patent application by Jed Wilson, Kate Nogarede and Greg Rousch, assigned to the same assignee, titled "Method and Apparatus for Videoconference Interaction with Bluetooth-enabled Cellular Telephone," Ser. No. 11/075,616, filed on the same day as this application.

BACKGROUND OF THE INVENTION

1. Field of the Invention

This invention relates to speakerphones and more specifically to speakerphones with a cellular phone connection.

2. Description of the Related Art

The telephone has long been an essential tool for communication. There are many types of telephones based on the many ways to categorize the telephone family. A telephone may use a land line, which may be an analog Plain Old Telephone Service (POTS) line, a digital service line such as an Integrated Services Digital Network (ISDN) line, or a digital interface to a PBX which will use a T1 or PRI line. A telephone may use wireless communication to connect to the telephone network and thus to another telephone. This is commonly known as a cellular phone, if it uses a cellular network to connect to the telephone network; or a satellite phone, if it connects to telephone network through a satellite. A telephone may use radio waves to connect to a base station, which in turn connects to a telephone network using land lines. This is typically known as a cordless phone.

A telephone may have a handset, which includes a microphone and an earphone. A user has to hold the handset in a hand and hold it close to his head to make a conversation with another user on the far end of the telephone network. Many telephones may have hand-free options, where a user does not have to hold a handset. One such option is a headset, which is a good option for one-on-one private conversation. Another option is typically known as speakerphone. In the speakerphone option, the voice from the far end is reproduced through a loudspeaker. The volume from this loudspeaker is typically much louder than an earphone on a handset or a headset, so that many people can hear it. The telephone also has a microphone which can receive the near end user's voice. Because the sound from the loudspeaker in a speakerphone can reach the microphone in the speakerphone, it may cause positive feedback. Thus the speakerphone has to do more processing than a regular telephone to make it operable. A speakerphone may operate in full-duplex mode with some echo cancellation. In this mode, the near user of the speakerphone can listen to the far end user talking while at the same time be talking to the other user. A speakerphone may operate in only half-duplex mode, where only one person can speak and be heard at one time. The other person cannot be heard until the first person stops speaking completely. That need for extra processing, especially in the full-duplex mode, makes speakerphones typically more complicated and more expensive than telephones without speakerphone capabilities. The ability to allow hand-free telephone conversation makes a speakerphone a nice option in some situations. The ability to allow many users to participate in a telephone conference makes a speakerphone an essential piece of equipment in many situations, such as in many businesses. There are many full-featured speakerphones installed in virtually all conference rooms in all business offices.

Because of the complexity of speakerphones, they are typically bulkier and consume more electric power. They typically sit on a conference room tables, connecting to land lines and electric power sockets. Speakerphones have not used wireless connections. This inability to use a wireless connection is limiting the use of full feature speakerphones.

There are many other situations that a speakerphone may be required, for example in a mobile office or temporary office. While it is typically difficult to access a land line and even harder to add an additional land line in the mobile office or temporary office, it is relatively cheap and easy to add a wireless connection. In many situations, to add a wireless connection is done simply by bringing a wireless telephone handset to the location. In many parts of the world where the land line telephone network is undeveloped, cellular or satellite connection may be the only economical way to gain access to a telephone network. There is a need to make speakerphone available to locations where access to land lines is difficult.

There are some attempts to address the problem. Some vendors sell accessories for some cellular phones to add the speakerphone capability to those specific cellular phones. For example, a CCM Clip n Go attachment may add speakerphone capability to Motorola Vxx series or Nokia 33xx series cellular phones. A Dock 'N' Talk speakerphone system may add speakerphone capability to Motorola StarTalk series cellular phones. All these accessories are low quality add-ons with very limited capabilities. They may be capable of supporting hand-free conversation, but only marginally capable to be used in a telephone conference through the cellular phone link. Therefore, there is still a need to make full featured, conference-capable speakerphones available to cellular phone users.

It is desirable to have a method and an apparatus to take advantage of the large installed base of full featured speakerphones and to make them more useful. It is desirable to bring the full featured speakerphone capabilities to locations that are not serviced by land lines.

BRIEF SUMMARY OF THE INVENTION

Embodiments according to the present invention use common sockets and cables to add a wireless linkage to full featured speakerphones. They also bring full featured speakerphones to wherever there is a wireless telephone handset. According to one embodiment of the current invention, a jack is added to a speakerphone. A cable with two connectors may be used to connect to the speakerphone at one end and a wireless phone at the other end. One connector of the cable may be plugged into the new headset jack. The other connector of the cable may be plugged into the headset connector of the wireless phone. To the wireless phone, the speakerphone is just a generic headset with a microphone and an earphone. To the speakerphone, the wireless phone is an outlet for processed microphone signals and an inline feed for the loudspeakers.

In one embodiment, the jack on the speakerphone is a common three-wire headset jack, with one wire contact for each of three signals: the microphone signal, the loudspeaker signal, and the ground.

In another embodiment, the jack on the speakerphone is a standard jack, such as a USB jack.

In another embodiment, the speakerphone is a battery powered speakerphone.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

According to the current invention, a wireless phone connection is added to a land line-based speakerphone. This new connectivity makes an existing speakerphone more usable in areas where a land line is hard to find or unable to support a speakerphone.

Figure 1:
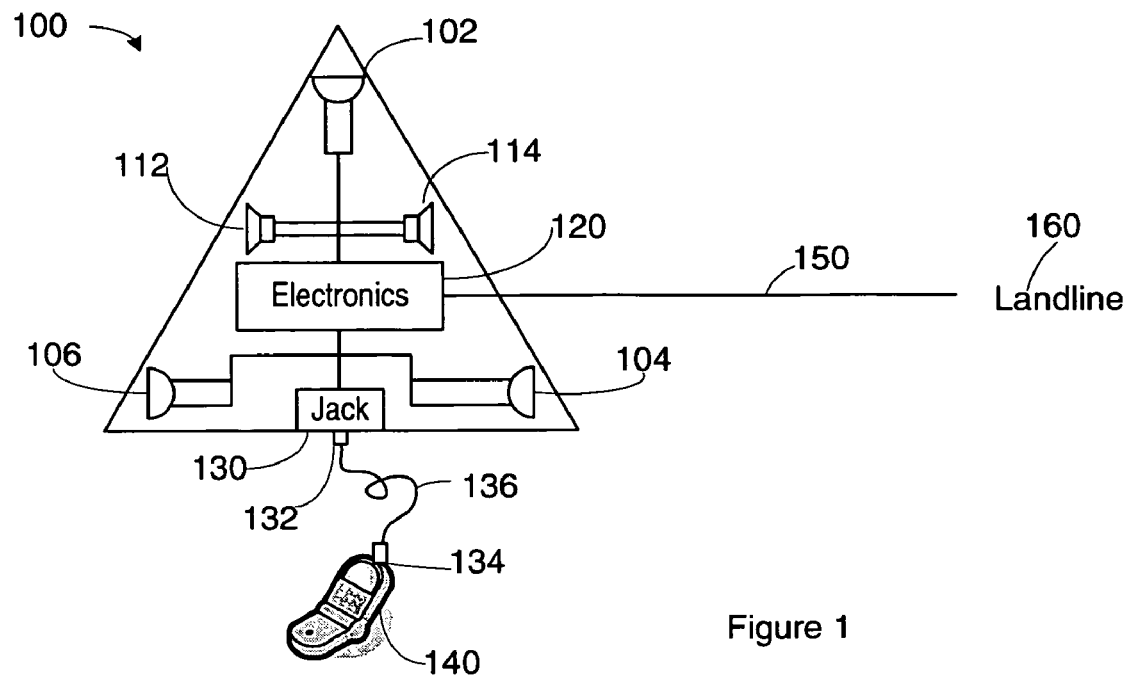
FIG. 1 depicts one embodiment of the current invention where a speakerphone connected to a land line with a telephone cord. The speakerphone has a jack, through which a wireless phone handset is connected to make a wireless link to the telephone network.

Referring to FIG. 1, a speakerphone 100 is connected to a land line 160 with a telephone cord 150. The speakerphone 100 may have a plurality of microphones (102, 104, 106) and loudspeakers (112, 114). Although in the embodiment shown in FIG. 1, two loudspeakers (112, 114) and three microphones (102, 104, 106) are installed, only one loudspeaker and one microphone is required. Any number of loudspeakers or microphones may be installed. The speakerphone 100 also has an electronic module 120 coupled to the various components. This full featured speakerphone 100 may have many features and capabilities. For example, it may have a regular telephone keypad, onhook/offhook, conference, mute, volume up/down keys, menu and navigation keys. It may also have three context sensitive softkeys including redial, hold, and programmable conference key. The loudspeakers have a large frequency response range, possible from 300-4000 Hz, or 200-12,000 Hz. The console microphones may have a similar response range. The speakerphone may have acoustic clarity of full duplex, automatic gain control up to 9 feet microphone pickup range, gated microphones with intelligent microphone mixing and dynamic noise reduction functions. An example of a speakerphone with these general characteristics is the VTX 1000 from Polycom Corp., the assignee of the current application.

According to one embodiment of the current invention, a new jack 130 is installed in such a speakerphone 100. With such a jack 130 which is capable of receiving a three wired plug 132, a cable 136 can connect the speakerphone 100 to a handset-style cellular phone 140. The cable 136 preferably has two connectors 132 and 134. Each has a three-wire plug (132 and 134). Each wire carries a different signal, one for the microphone signal, one for the loudspeaker signal, and one for the common or ground signal. One of the plugs 132 or 134 is designed to be compatible with a jack (130) in the speakerphone 110. The other plug 134 or 132 is capable of plugging into a headset jack (not shown) on a cellular phone handset 140. Typically, the jack 130 is 2.5 mm cell phone headset connector, which provides an output from the cell phone to drive a headset earphone and an input to the cell phone from the headset microphone. For the cell phone handset 140, the speakerphone 100 acts as if it is just a headset with a microphone and earphone. The microphones (102, 104, 106) on the speakerphone 100 will pickup voices from conference participants and perform some processing on such voice signals. For example, the microphones (102, 104, 106) on the speakerphone 100 will pick up voices of conference participants and sound from the loudspeakers (112, 114) of the speakerphones. The speakerphone 110 will cancel or reduce the amplitudes of the signal responsive to the loudspeakers (112, 114) of the speakerphone 110 so as to avoid echoes or feedforward effects. The processed microphone signals will then be transmitted to the microphone wire into the cell phone 140 as if the signal is from a microphone in a headset directly. The signal for earpiece from the cell phone handset 140 is provided to the speakerphone 100. This signal is also further processed, amplified and then replayed through the loudspeakers 112 and 114 on the speakerphone 110. As far as the speakerphone 100 is concerned, the cell phone handset 140 is just an output for processed microphone signals and an input for the loudspeaker amplifier.

Although this new jack may be very similar mechanically to a common headset jack present in some prior art speakerphones, this new jack is very different in terms of electric connection and functionality to other parts of the speakerphone. For a typical prior art speakerphone headset jack, when a headset is plugged into the jack, the jack disconnects and disables the microphone and the loudspeaker in the speakerphone. The speakerphone is acting as a base set and the headset is acting as a headset. The loudspeaker signal is being provided from the speakerphone and the microphone signal is being provided to the speakerphone.

To the contrary, when a similar plug is plugged into this new jack, the microphone and the loudspeaker in the speakerphone are not disabled. The speakerphone is acting as a headset for a connected wireless phone, and the connected wireless phone is acting as a base. With this new jack, the loudspeaker signal is being provided into the speakerphone and the microphone signal is being provided from the speakerphone.

It is common for a cell phone handset to disable the microphone and the loudspeaker on the handset when a headset is plugged into the headset connector. The cell phone handset can automatically sense the presence of the headset, either mechanically or electronically. Similarly, when the plug is plugged into the jack of the speakerphone, the speakerphone will automatically detect the presence of signals from the cell phone handset and may disconnect the connection to the land line. In this way the connection through the land line to a telephone network and the connection through the cell phone to a telephone network will not conflict with each other. Similar to the cell phone handset, the switch between land line link or cell phone link may also be automatic with mechanical micro-switch or electronic logic. The mechanical micro switch may be embedded in the jack itself.

Figure 2:
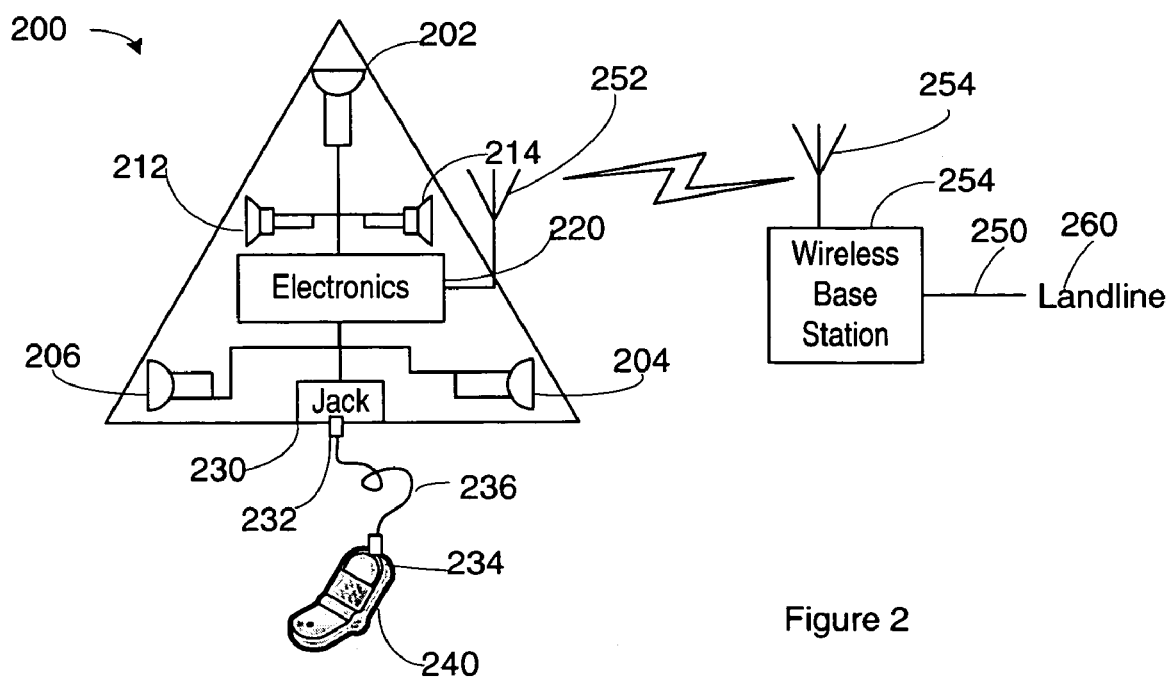
FIG. 2 depicts another embodiment of the current invention where a speakerphone is connected to a land line via RF and a base station, which is connected to wired telephone network. The speakerphone has a jack, through which a wireless phone handset is connected to make a wireless link to the telephone network.

Referring now to FIG. 2, it illustrates another embodiment 200 of the current invention. This embodiment 200 is essentially the same as the embodiment 100 illustrated in FIG. 1 except that the speakerphone 200 is not connected to the land line 260 directly through an electric cable 250. Instead, the speakerphone 200 is connected to the land line telephone network 260 through a radio link between antenna 252 on the speakerphone 200 and antenna 254 on a base station 256. The base station 256 is connected to the land line telephone network 260 directly with an electric cable 250. The connection between the speakerphone 100 and the base station 256 is one of many radio frequency technologies. The radio frequency technology could be the 2.4 GHz WDTC technology with voice encryption, or 900 MHz radio frequency connection. All other functionalities of the speakerphone 200 are identical to that illustrated in FIG. 1. For example, speakerphone 200 has the same microphones 202, 204 and 206, same loudspeakers 212 and 214, electronics module 220, and jack 230 which can be connected to a cell phone handset 240 via cable 236 and plugs 232 and 234.

Still referring to the embodiment shown in FIG. 2, the speakerphone 200 may be powered by a battery (not shown), such that there is no wire between the speakerphone 200 and the telephone network. This speakerphone 200 may be placed anywhere in a conference room without being entangled with wires. This speakerphone 200 may have the additional jack 230 to make a wireless connection through a cellular phone handset 240. In such a situation the speakerphone 200 does not communicate with the base station 256. Thus using the cellular phone handset and the battery powered speakerphone allows a high quality conference call to occur in any location where the cellular phone can connect to the system. Furthermore, if the wireless handset 240 is a satellite phone, then a full featured telephone conference may take place any place where there is a view of sky.

Once the speakerphone is connected through a cell phone link, then all features available on the speakerphone or on the cell phone are now available for the cell phone conference call, especially the audio processing. The audio signals from the microphones in the speakerphone are processed by the audio processor in the speakerphone before transmitted to the far end. Depending on the features available on the speakerphone and the needs of a particular conference call, one or more, or some combinations of the following processes may be performed. One process is the acoustic echo cancellation which allows full duplex audio conference. In a full duplex audio conference, conference participants can all speak naturally and be heard by the people on the other side of the cell phone link, rather than taking turns to speak or risk being cut off in the middle of a sentence. The speakerphone may also activate dynamic noise reduction and compensation, such that background noise is at a comfortable level. A third additional process may be automatic gain control, such that sound level transmitted to the far end is stable and intelligible. A fourth process may be the dynamic gating of microphones. In a multi-microphone speakerphone system, a microphone is gated or opened only when somebody is speaking to it. When there is only background noise present in a microphone, then it is closed, i.e. its signal is ignored by the audio mixer. All of the gated microphone signals are then mixed to form an audio signal. The resulting signal has an improved Noise to Signal ratio. There can be many other processes incorporated in a speakerphone with a wireless phone link. The above four are just some examples for illustrative purposes.

Figure 3:
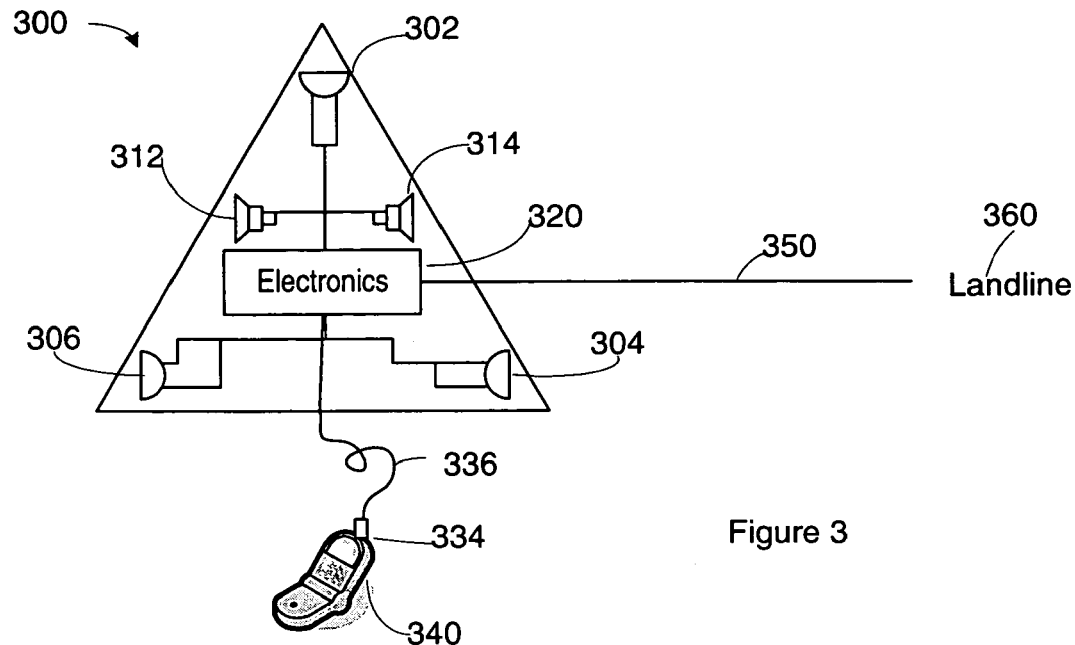
FIG. 3 depicts a similar embodiment as in FIG. 1, except with an attached cable.

FIG. 3 illustrates another embodiment of the current invention. It is similar to the embodiment in FIG. 1 and FIG. 2 except that it has a cable 336 attached to the speakerphone 300 itself. On the other end of the cable 336, there is a plug 334 which is operable to plug into a cell phone handset 340. A preferred plug will be the standard 2.5 mm cell phone headset connector. In this embodiment, a separate two connector cable is not required, eliminating the possibility of losing the cable for the speakerphone-cell phone connection at the time the connection is needed.

Figure 4:
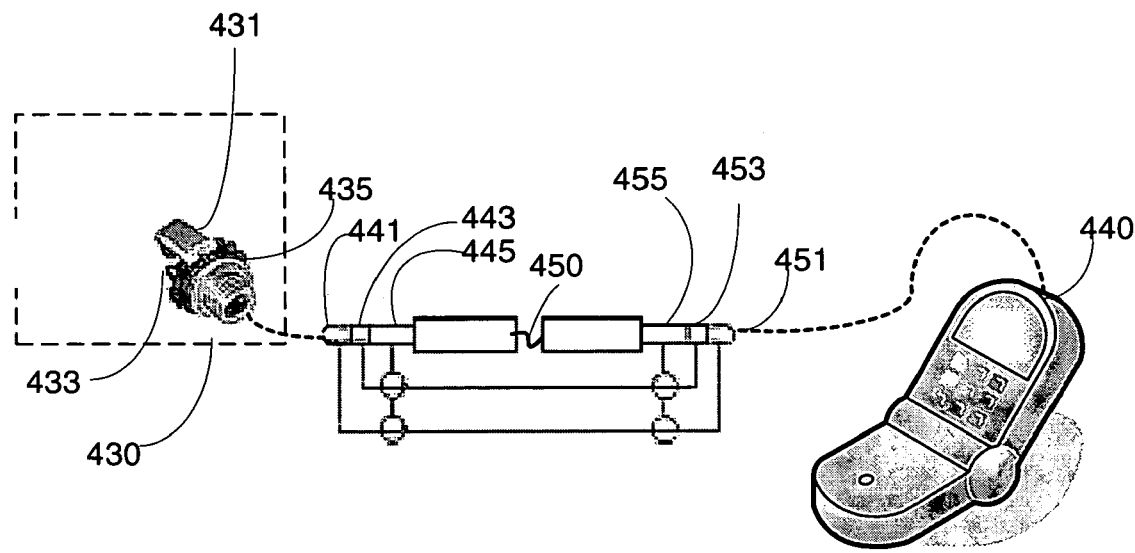
FIG. 4 depicts a standard three-wire jack with plug.

FIG. 4 illustrates the standard 2.5 mm cell phone headset connectors and cable 450, a jack 430 on a speakerphone (speakerphone not shown) and a wireless phone handset 440. There are three wires or contacts to make three connections. One connection is for each signal, including the signal for microphone (431, 441 and 451), the signal for the loudspeaker (433, 443, 453), and the signal for the common ground (435, 445, 455). When a plug is inserted into the jack 430 on a speakerphone, the contacts 431 and 433 for microphone and loudspeaker respectively may move slightly and mechanically break the connection between the telephone cable (for example 350) and the electronic module (for example 320) in the speakerphone (300).

Figure 5:
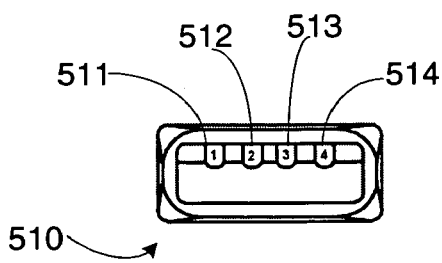
FIG. 5 depicts a four-wire jack.

In addition to the standard 2.5 mm cell phone headset connection, according to another embodiment of the current invention, another jack/connector may be used. Referring to FIG. 5, this connector may be a four-wire connector 510. The four wires or contacts are: one 511 for the power, one 514 for the ground, and the middle two 512 and 513 for data signals. An example of such connector is the standard USB connector. Many cell phones are now capable of not only transmitting analog voice signals, they can also communicate using digital signals through USB connectors with other electronic devices such as notebook computers or PDAs.

The addition of a USB connector would make it easier to connect a cell phone to a speakerphone, providing additional digital data that may be used to communicate other information such as controlling information, billing information and other data related to documents that are being discussed during a conference call.

The current invention is applicable not only to a narrowband cell phone; it is also applicable to a wideband cell phone.

In the current application, a socket or a jack is a female fitting in an electric circuit used with a plug to make a connection with another circuit. A plug is the corresponding male fitting used to make the connection. A cable may have two or more plugs and a plurality of wires to make connections for a plurality of electric paths. The plugs may be identical as shown in FIG. 4, where both plugs are standard 2.5 mm stereo plugs. The plugs may be of different sizes, even different types, to fit the connecting speakerphones and wireless phone handsets.

As described above, the embodiments according to the current invention extend the capability of full featured speakerphone; make those features available to any locations where wireless phone service is available; and make those features available even if electricity service or landline telephone service are not.

While illustrative embodiments of the invention have been illustrated and described, it will be appreciated that various changes can be made therein without departing from the spirit and scope of the invention.

The invention claimed is:

1. A speakerphone comprising:
a first link for connecting to a telephone network;
a microphone;
a loudspeaker;
a jack, wherein the jack is configured to couple to a headset jack of a wireless telephone handset, the wireless telephone handset comprising a handset microphone; and
an electronic module coupled to the first link, the microphone, the loudspeaker and the jack,
wherein the electronic module is operable to receive a first signal from the telephone network via the first link and to reproduce the first signal as sound via the loudspeaker;
wherein the electronic module is operable to receive a second signal from the microphone and to send, upon processing the second signal, a corresponding third signal to the telephone network via the first link;
wherein coupling the jack and the headset jack of the wireless telephone handset causes the first link to be automatically disabled;
wherein the electronic module is operable to receive a fourth signal from the jack, the fourth signal being sent from a far end to the wireless telephone handset;
wherein the speakerphone is operable to reproduce the fourth signal as sound via the loudspeaker;
wherein the electronic module is operable to receive the second signal from the microphone and, upon processing the second signal, send a corresponding fifth signal to the jack for transmission to the far end via the wireless telephone handset; and
wherein the wireless telephone handset microphone is automatically disabled in response to coupling of the jack of the speakerphone to the headset jack of the wireless telephone handset.

2. The speakerphone in claim 1, further comprising an internal power source coupled to the electronic module to power the speakerphone.

3. The speakerphone in claim 2, wherein the internal power source is a battery.

4. The speakerphone in claim 1, wherein the first link is a wired link.

5. The speakerphone in claim 4, wherein the wired link is a wired analog link to PSTN.

6. The speakerphone in claim 4, wherein the wired link is a wired digital link.

7. The speakerphone in claim 6, wherein the wired digital link is an ISDN link.

8. The speakerphone in claim 6, wherein the wired digital link is a PBX link.

9. The speakerphone in claim 1, wherein the first link is a wireless link.

10. The speakerphone in claim 9, wherein the wireless link comprises a radio transceiver coupled to the electronic module and a base station connected to a wired link to the telephone network.

11. The speakerphone in claim 1, wherein the jack is a 2.5 mm headset jack.

12. The speakerphone in claim 1, wherein the wireless phone handset is a cellular phone handset.

13. The speakerphone in claim 1, wherein the wireless phone handset is a satellite phone handset.

14. The speakerphone in claim 1, wherein the jack comprises at least three electric contacts, including one for a microphone signal, one for a speakerphone signal and one for ground.

15. The speakerphone in claim 1, wherein the jack comprises at least four electric contacts, including one for power, one for ground and two for data signal.

16. The speakerphone in claim 15, wherein the jack is a USB jack.

17. The speakerphone in claim 1, wherein the jack comprises a mechanical switch operable to disconnect the electronic module from the first link when a plug is inserted in the jack.

18. The speakerphone in claim 1, wherein the electronic module is operable to disconnect itself from the first link when a plug is inserted in the jack.

19. The speakerphone in claim 1, wherein the processing by the electronic module of the second signal to develop the third signal comprises one or more of processes of:
acoustic echo cancellation,
dynamic noise reduction and compensation,
automatic gain control, and
gated microphone with intelligent microphone mixing.

20. A speakerphone comprising:
a first link to a telephone network;
a microphone;
a loudspeaker;
a cable having a first end and a second end; and
an electronic module coupled to the first link, the microphone, the loudspeaker and the first end of the cable;
wherein the second end comprises a plug operable to couple to a headset jack of a wireless telephone handset, the wireless telephone handset comprising a handset microphone;
wherein the electronic module is operable to receive a first signal from the telephone network via the first link and to reproduce the first signal as sound via the loudspeaker;
wherein the electronic module is operable to receive a second signal from the microphone and to send, upon processing the second signal, a corresponding third signal to the telephone network via the first link;
wherein coupling the second end of the cable to the headset jack of the wireless telephone handset causes the first link to be automatically disabled;
wherein the electronic module is operable to receive a fourth signal from the plug, the fourth signal being sent from a far end to the wireless telephone handset;
wherein the electronic module is operable to reproduce the fourth signal as sound via the loudspeaker;
wherein the electronic module is operable to receive the second signal from the microphone and, upon processing the second signal, send a corresponding fifth signal to the plug for transmission to the far end via the wireless telephone handset; and
wherein the wireless telephone handset microphone is automatically disabled in response to coupling the second end of the cable to the headset jack of the wireless telephone handset.

21. The speakerphone in claim 20, further comprising an internal power source coupled to the electronic module to power the speakerphone.

22. The speakerphone in claim 21, wherein the internal power source is a battery.

23. The speakerphone in claim 21, wherein the processing by the electronic module comprises one or more of processes of acoustic echo cancellation; dynamic noise reduction and compensation; automatic gain control; and gated microphone with intelligent microphone mixing.

24. The speakerphone in claim 20, wherein the first link is a wired link.

25. The speakerphone in claim 24, wherein the wired link is a wired analog link to PSTN.

26. The speakerphone in claim 24, wherein the wired link is a wired digital link.

27. The speakerphone in claim 26, wherein the wired digital link is an ISDN link.

28. The speakerphone in claim 26, wherein the wired digital link is a PBX link.

29. The speakerphone in claim 20, wherein the first link is a wireless link.

30. The speakerphone in claim 29, wherein the wireless link comprises a radio transceiver coupled to the electronic module and a base station connected to a wired link to the telephone network.

31. The speakerphone in claim 20, wherein the plug is a 2.5 mm headset plug.

32. The speakerphone in claim 20, wherein the wireless phone handset is a cellular phone handset.

33. The speakerphone in claim 20, wherein the wireless phone handset is a satellite phone handset.

34. The speakerphone in claim 20, wherein the plug is a USB plug.

35. The speakerphone in claim 20, wherein the electronic module is operable to disconnect the first link when the plug is connected to the wireless phone handset.

36. A speakerphone capable of communicating via a landline telephone connection and via a cellular telephone connection, the speakerphone comprising:
   a first link for connecting to a landline telephone network;
   a second link for connecting to a cellular telephone network;
   a microphone;
   a loudspeaker; and
   an electronic module coupled to the first link, the second link, the microphone, and the loudspeaker,
   wherein the second link comprises a jack operable to couple to a headset jack of a cellular telephone handset, the cellular telephone handset comprising a handset microphone;
   wherein the electronic module is operable to process a first signal received from the landline telephone network via the first link and to reproduce the processed first signal as sound via the loudspeaker of the speakerphone;
   wherein the electronic module is operable to process a second signal received from the microphone of the speakerphone and to send the processed second signal to the landline telephone network via the first link;
   wherein coupling the jack to the headset jack of the cellular telephone handset causes the first link to be automatically disabled;
   wherein the electronic module is operable to process a third signal received from the cellular telephone network via the headset jack and reproduce the processed third signal as sound via the loudspeaker of the speakerphone;
   wherein the electronic module is operable to process the second signal received from the microphone of the speakerphone and send the processed second signal to the cellular telephone network via the headset jack; and
   wherein the cellular telephone handset microphone is automatically disabled in response to coupling of the jack to the headset jack of the cellular telephone handset.

37. A speakerphone capable of communicating via a landline telephone connection and via a cellular telephone connection, the speakerphone comprising:
   a first link for connecting to a landline telephone network;
   a second link for connecting to a cellular telephone network;
   a microphone;
   a loudspeaker; and
   an electronic module coupled to the first link, the second link, the microphone, and the loudspeaker,
   wherein the second link comprises a Universal Serial Bus (USB) jack operable to couple to a jack of a cellular telephone handset, the cellular telephone handset comprising a handset microphone;
   wherein the electronic module is operable to process a first signal received from the landline telephone network via the first link and to reproduce the processed first signal as sound via the loudspeaker of the speakerphone;
   wherein the electronic module is operable to process a second signal received from the microphone of the speakerphone and to send the processed second signal to the landline telephone network via the first link;
   wherein coupling the USB jack of the speakerphone to the jack of the cellular telephone handset causes the first link to be automatically disabled;
   wherein the electronic module is operable to process a third signal received from the cellular telephone network via the USB jack and reproduce the processed third signal as sound via the loudspeaker of the speakerphone;
   wherein the electronic module is operable to process the second signal received from the microphone of the speakerphone and send the processed second signal to the cellular telephone network via the USB jack; and
   wherein the cellular telephone handset microphone is automatically disabled in response to coupling of the USB jack to the jack of the cellular telephone handset.

38. A method for using a speakerphone with a wireless phone handset for a conference call, wherein the speakerphone comprises an interface to a landline telephone network, and wherein the wireless phone handset comprises an interface to a wireless communication network, the method comprising:
   coupling a headset jack of the wireless phone handset to a jack of the speakerphone;
   automatically disabling a microphone of the wireless phone handset in response to coupling the headset jack of the wireless phone handset to the jack of the speakerphone;
   coupling the headset jack of the wireless phone handset to the jack of the speakerphone causes the interface to the landline telephone network to be automatically disabled;
   receiving, via the wireless phone handset, a first signal transmitted from a far end;
   reproducing the first signal as sound via a loudspeaker of the speakerphone; and
   receiving a second signal from a microphone of the speakerphone and, upon processing the second signal by the speakerphone, sending a corresponding third signal from the speakerphone to the wireless phone handset via the jack of the speakerphone for transmission to the far end via the wireless communication network.

39. The method for claim 38, further comprising:
   automatically disabling a speaker of the wireless phone handset in response to coupling the headset jack of the wireless phone handset to the jack of the speakerphone.

40. The method in claim 38, further comprising:
   powering the speakerphone with a portable power source.

* * * * *